US006532416B1

United States Patent
Mueller

(12) United States Patent
(10) Patent No.: US 6,532,416 B1
(45) Date of Patent: Mar. 11, 2003

(54) APPARATUS, METHOD AND SYSTEM FOR A WIRELESS COMMUNICATION AND LOCAL POSITIONING SYSTEM IN AN AUTOMATED, INDUSTRIAL AND/OR MANUFACTURING ENVIRONMENT

(75) Inventor: Oswald Mueller, Glauburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/575,958

(22) Filed: May 23, 2000

(51) Int. Cl.[7] ............................ H04Q 7/20; H04Q 7/32; G01G 19/40
(52) U.S. Cl. ........................ 701/207; 701/213; 455/524; 455/561
(58) Field of Search .................................. 701/207, 213; 455/524, 561, 500, 39; 342/457, 458, 450, 357.08

(56) References Cited

U.S. PATENT DOCUMENTS

| | | | | |
|---|---|---|---|---|
| 3,680,121 A | * | 7/1972 | Anderson et al. | 343/112 TC |
| 3,714,650 A | * | 1/1973 | Fuller et al. | 343/6.5 LC |
| 3,774,215 A | * | 11/1973 | Reed | 343/112 D |
| 3,848,254 A | * | 11/1974 | Drebinger et al. | 343/112 R |
| 5,822,224 A | * | 10/1998 | Nakanishi et al. | 364/567 |
| 5,859,879 A | * | 1/1999 | Bolgiano et al. | 375/347 |
| 5,890,068 A | * | 3/1999 | Fattouche et al. | 455/456 |
| 5,913,170 A | * | 6/1999 | Wortham | 455/457 |
| 6,314,285 B1 | * | 11/2001 | Isberg et al. | 455/418 |

FOREIGN PATENT DOCUMENTS

EP 0 485 879 5/1992

* cited by examiner

Primary Examiner—Tan Q. Nguyen
Assistant Examiner—Dalena Tran
(74) Attorney, Agent, or Firm—Harness, Dickey & Pierce, PLC

(57) ABSTRACT

A local positioning method for use with a vehicle system in an industrial environment, the method including the steps of communicating a first transmitter identification associated with a first transmitter location, a second transmitter identification associated with a second transmitter location, and at least a third transmitter identification associated with at least a third transmitter location to a vehicle, receiving the first transmitter identification, the second transmitter identification and the at least the third transmitter identification at the vehicle, determining a first positioning parameter of the vehicle based on the first transmitter identification, a second positioning parameter of the vehicle based on the second transmitter identification, and at least a third positioning parameter of the vehicle based on the at least the third transmitter identification, determining a position of the vehicle based on the first positioning parameter, the second positioning parameter and the at least the third positioning parameter, and communicating at least the position from the vehicle to a controller arrangement that is adapted to control the vehicle system.

21 Claims, 5 Drawing Sheets

APPARATUS, METHOD AND SYSTEM FOR A WIRELESS COMMUNICATION AND LOCAL POSITIONING SYSTEM IN AN AUTOMATED, INDUSTRIAL AND/OR MANUFACTURING ENVIRONMENT

FIELD OF THE INVENTION

The present invention concerns an apparatus, method and system for a wireless communication and local positioning system in an industrial or manufacturing environment, including an automated industrial and/or manufacturing environment. The present invention further concerns a communication and local positioning apparatus, method and system for use with industrial or manufacturing trolleys or other vehicles, including track-bound and nontrack-bound industrial trolley or other vehicle systems.

BACKGROUND INFORMATION

There are at least certain systems that are being used for controlling industrial vehicles, such as suspended electric trolleys or other vehicles. Such a system may include a transmission system that transmits control and report commands to the sliding contacts of an industrial trolley or vehicle. In particular, various sensors and code systems may be externally mounted on the tracks for position detection. The signals associated with the various sensors and code systems must be analyzed by a vehicle control system using relatively complex methods. Also, such a system may, however, be relatively expensive, and may include, for example, relatively high installation and startup costs.

Other systems may use ultrasonic sound to determine a vehicle location, but such systems may be limited because other information is not transmittable to or from the vehicle using the ultrasonic transmissions.

It is therefore believed that there is a need for an improved apparatus, method and system that may be used, for example, to simplify a track-based vehicle system that uses sliding contacts by reducing the number of sliding contacts. Thus, for example, whereas seven (7) sliding contacts may be necessary in certain systems, fewer sliding contacts, such as, for example, four (4) sliding contacts, may only be needed for such an improved apparatus, method and system since sliding contacts may only be needed for the power supply system, rather than for the positioning system. It is also believed that there is a need to improve existing track-based vehicle systems, in which, for example, track sections that have been powered and controlled separately may no longer be required, so that such track sections need not be replaced. It is further believed that there is a need for improving existing systems, in which, for example, the various associated sensors or code systems that are mounted externally on the tracks may no longer be required so that such sensors and code system need not be replaced. It is also believed that there is a need for an apparatus, method and system, in which such track sections, sensors and code systems need not be used, as may have been required by other systems. It is further believed that there is a need for an apparatus, method and system in which additional vehicle information may be transmitted to or from the trolleys or other vehicles.

SUMMARY OF THE INVENTION

An exemplary embodiment of the present invention is directed to a local positioning method for use with a vehicle system in an industrial environment, the method including the steps of: communicating a first transmitter identification associated with a first transmitter location, a second transmitter identification associated with a second transmitter location, and at least a third transmitter identification associated with at least a third transmitter location to a vehicle; receiving the first transmitter identification, the second transmitter identification and the at least the third transmitter identification at the vehicle; determining a first positioning parameter of the vehicle based on the first transmitter identification, a second positioning parameter of the vehicle based on the second transmitter identification, and at least a third positioning parameter of the vehicle based on the at least the third transmitter identification; determining a position of the vehicle based on the first positioning parameter, the second positioning parameter and the at least the third positioning parameter; and communicating at least the position from the vehicle to a controller arrangement that is adapted to control the vehicle system.

Another exemplary embodiment of the present invention is directed to a local positioning system for use with a vehicle system in an industrial environment, the system including: a controller arrangement that is adapted to control the vehicle system; a transmitter arrangement that is adapted to communicate a first transmitter identification associated with a first transmitter location; a second transmitter identification associated with a second transmitter location, and at least a third transmitter identification associated with at least a third transmitter location to a vehicle; a receiving arrangement associated with the vehicle and that is adapted to receive the first transmitter identification, the second transmitter identification and the at least the third transmitter identification; a processing arrangement associated with the vehicle and that is adapted to determine: a first positioning parameter of the vehicle based on the first transmitter identification; a second positioning parameter of the vehicle based on the second transmitter identification; at least a third positioning parameter of the vehicle based on the at least the third transmitter identification; and a position of the vehicle based on the first positioning parameter, the second positioning parameter and the at least the third positioning parameter; and a communicating arrangement associated with the vehicle and that is adapted to communicate at least the position of the vehicle to the controller arrangement.

Still another exemplary embodiment of the present invention is directed to a local positioning system for use with a vehicle system in an industrial environment, the system including: means for controlling a vehicle system; means for communicating a first transmitter identification associated with a first transmitter location, a second transmitter identification associated with a second transmitter location, and at least a third transmitter identification associated with at least a third transmitter location to a vehicle; means for receiving the first transmitter identification, the second transmitter identification and the at least the third transmitter identification, wherein the means for receiving is associated with the vehicle; means for determining a first positioning parameter of the vehicle based on the first transmitter identification, a second positioning parameter of the vehicle based on the second transmitter identification, and at least a third positioning parameter of the vehicle based on the at least the third transmitter identification; means for determining a position of the vehicle based on the first positioning parameter, the second positioning parameter and the at least the third positioning parameter; and means for communicating at least the position of the vehicle to the means for controlling.

Yet another exemplary embodiment of the present invention is directed to a local positioning method for use with a vehicle system in an industrial environment, the method including the steps of: communicating a first transmitter identification associated with a first transmitter location, a second transmitter identification associated with a second transmitter location, a third transmitter identification associated with a third transmitter location, and a fourth transmitter identification associated with a fourth transmitter location to a vehicle; receiving the first transmitter identification, the second transmitter identification, the third transmitter identification, and the fourth transmitter identification at the vehicle; determining a first positioning parameter of the vehicle based on the first transmitter identification, a second positioning parameter of the vehicle based on the second transmitter identification, a third positioning parameter of the vehicle based on the third transmitter identification, and a fourth positioning parameter of the vehicle based on the fourth transmitter identification; determining a position of the vehicle based on the first positioning parameter, the second positioning parameter, the third positioning parameter, and the fourth positioning parameter; and communicating at least the position from the vehicle to a controller arrangement that is adapted to control the vehicle system.

Still another exemplary embodiment of the present invention is directed to a vehicle communication and processor system for use in a local positioning system having a plurality of transceivers and a vehicle system, including a controller arrangement that is adapted to control the vehicle system, in an industrial environment, the system including: a receiving arrangement being associated with the vehicle and being adapted to receive a first transmitter identification associated with a first transmitter location, a second transmitter identification associated with a second transmitter location, and at least a third transmitter identification associated with at least a third transmitter location; a processing arrangement that is adapted to determine: a first positioning parameter of the vehicle based on the first transmitter identification; a second positioning parameter of the vehicle based on the second transmitter identification; at least a third positioning parameter of the vehicle based on the at least the third transmitter identification; and a position of the vehicle based on the first positioning parameter, the second positioning parameter and the at least the third positioning parameter; and a communicating arrangement being associated with the vehicle and being adapted to communicate at least the position of the vehicle to the controller arrangement.

DETAILED DESCRIPTION

Figure 1:
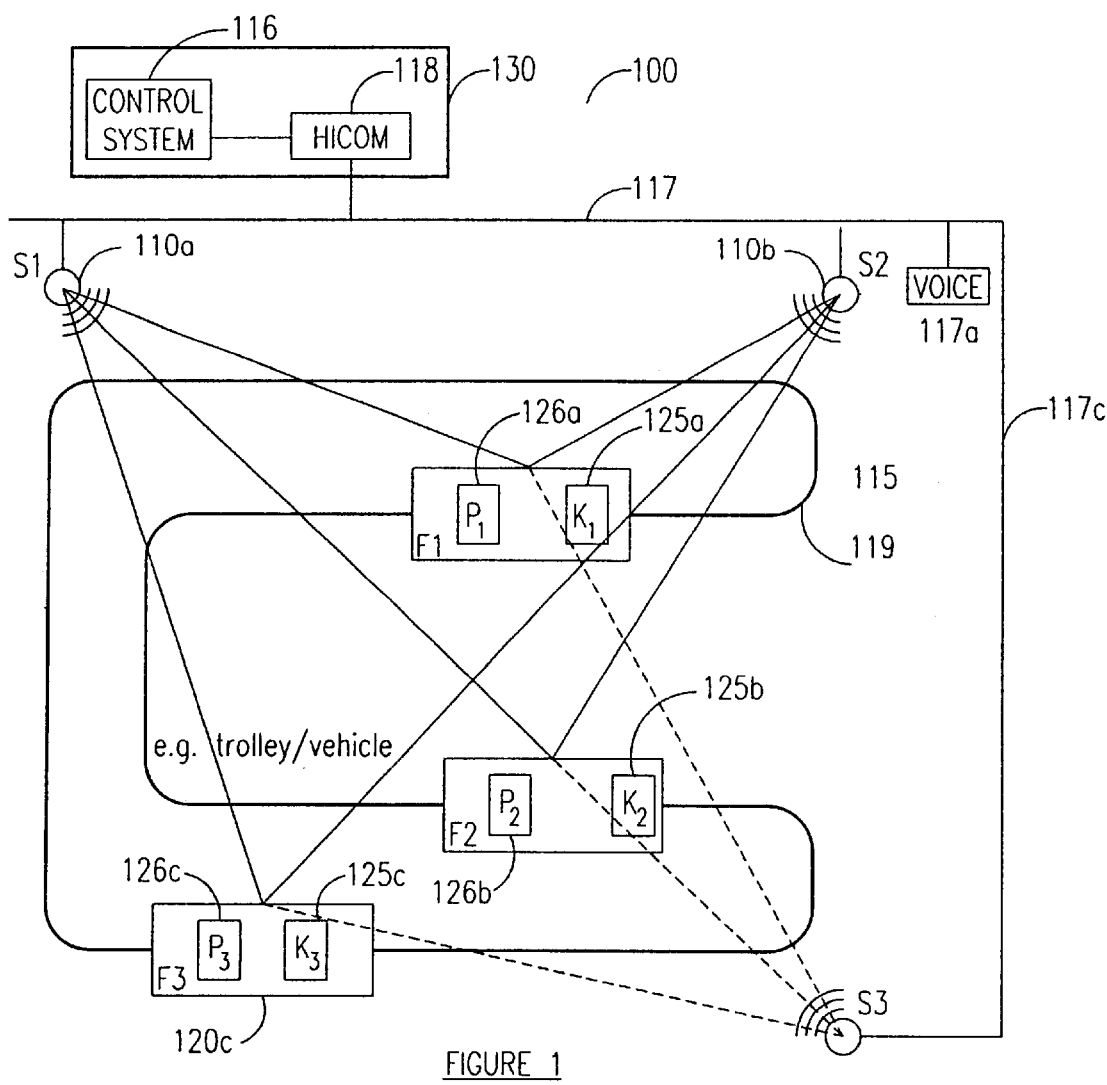
FIG. 1 shows a system schematic of a communication and local positioning system having a triple transmitter or transceiver layout of an exemplary embodiment of the present invention.
Figure 3A:
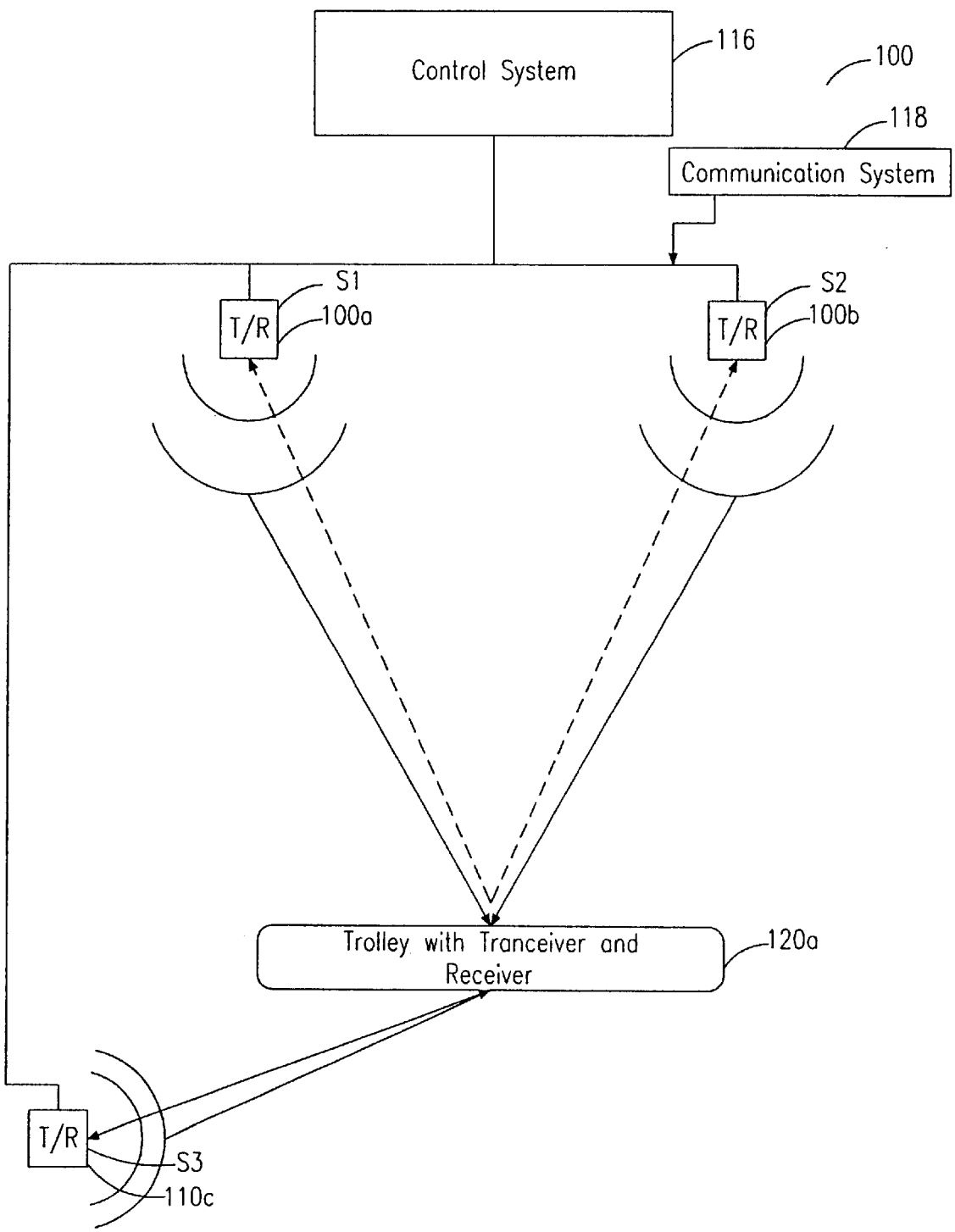
FIG. 3A shows a simplified view of FIG. 1.
Figure 3B:
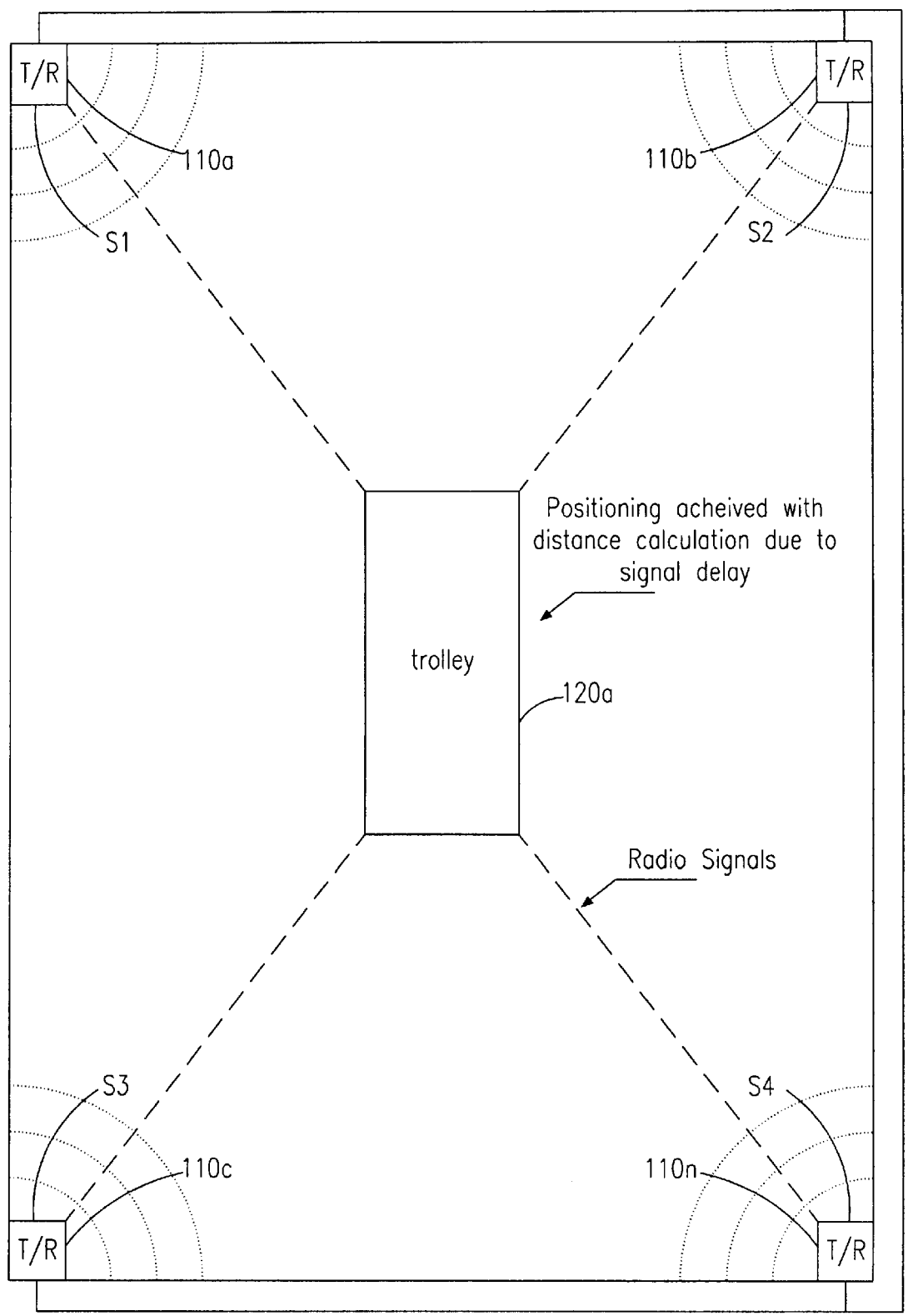
FIG. 3B shows a quadruplet transmitter or transceiver layout for use with the systems of FIG. 1 and FIG. 3A.

FIG. 1 shows a system schematic of a communication and local positioning system 100 having a dual transceiver layout of an exemplary embodiment of the present invention. As shown in FIG. 1, and depending on the specific system configuration, a "triple transceiver" system may be used to determine the position of a trolley or other vehicle. In FIG. 3A is shown a simplified system schematic of the communication and local positioning system 100 having a triple transceiver layout. In both Figures, system components have the same designations. In FIG. 3B is shown a system schematic of the communication and local positioning system 100 having a quadruplet transmitter or transceiver layout.

The system 100 operates as follows. A plurality of transmitters or transceivers S1, S2, S3, . . ., Sn (110a, 110b, 110c, . . ., 110n) is installed at an industrial and/or manufacturing site. Each of the plurality of transmitters or transceivers S1, S2, S3, . . ., Sn (110a, 110b, 110c, . . ., 110n) is linked by a communication and controller arrangement 130 having a controller arrangement 116 that is adapted, arranged or otherwise configured to control the trolley or vehicle system 115, and which may also include a communication bus 117 and/or a wireless communication sub-system 118. Each of the transmitters or transceivers S1, S2, S3, . . ., Sn (110a, 110b, 110c, . . ., 110n) periodically or otherwise communicates or transmits a signal or message to a trolley or vehicle F1, F2, F3, . . ., Fn (120a, 120b, 120c, . . ., 120n) of a trolley or vehicle system 115 having a vehicle path or a track 119. In particular, the signal or message includes a time-stamp, which corresponds to the time at which the signal or message is sent to the trolley or other vehicle F1, F2, F3, . . ., Fn (120a, 120b, 120c, . . ., 120n), which may "share" a common clock signal with the controller arrangement 115 of the communication and local positioning system 100. In this way, a signal transmission delay can be determined by a position processor at each of the trolleys or other vehicles F1, F2, F3, . . ., Fn (120a, 120b, 120c, . . ., 120n) and/or the controller arrangement 116.

As it is further discussed with respect to the exemplary embodiments discussed in the present application, the trolley or other vehicle positions are determined at each of the trolleys or other vehicles 110a, 110b, 110c, . . ., 110n and then communicated or transmitted to the controller arrangement 116. In addition to the position signals, of course, other information may be communicated or transmitted from each of the trolleys or other vehicles F1, F2, F3, . . ., Fn (120a, 120b, 120c, . . ., 120n) to the controller arrangement 116. Such additional information may include, for example, load status, maintenance status, emergency stop and/or other trolley or other vehicle action command signals.

Figure 2:
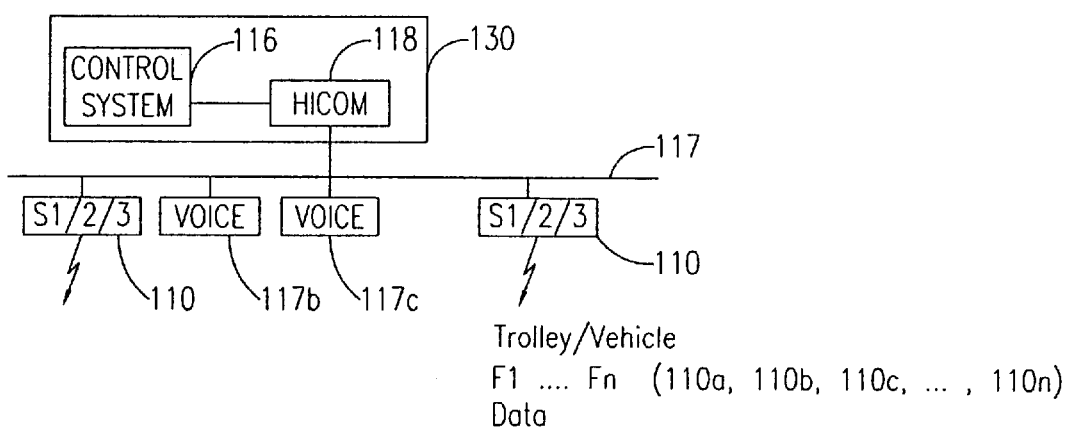
FIG. 2 shows a system schematic of the control and communication system of FIG. 1A and FIG. 3.

FIG. 2 shows a system schematic of a communication and local positioning controller of the communication and local positioning system of FIG. 1 and FIG. 3A. In particular, FIG. 2 shows a controller arrangement 116 that is adapted or otherwise configured to control a trolley or other vehicle system 115 and its associated trolleys or other vehicles F1, F2, F3, . . ., Fn (120a, 120b, 120c, . . ., 120n) of FIGS. 1 and 3A, as will be discussed below. The communication and controller arrangement includes the communication system that may include a wireless communication sub-system 118, which may be, for example, a DECT wireless communication sub-system, having communication sub-systems 117a, 117b and 117c, which may be voice and/or data wireless communication components, such as a wireless base station, and/or a voice handset, for example, and/or the communication bus system 117, which may be, for example, a Process Field Bus (PROFIBUS) arrangement for interconnecting the wireless communication sub-systems 117a, 117b and 117c and the controller arrangement 116.

To the extent appropriate, the wireless communication system may include suitably modified versions of the time division multiple access ("TDMA") wireless system, the code division multiple access ("CDMA") wireless system, the Pan European digital cellular standard system, which is also known as global system for mobile wireless ("GSM"), the universal mobile telecommunication system ("UMTS") and, in particular, the digital enhanced cordless telephone ("DECT") wireless system.

In particular, for example, the DECT wireless system, where approved, is able to accommodate data transmissions for users, and it is believed that a DECT type system should be relatively cost-effective for use in an industrial environment. The DECT system provides a cordless communications framework for high traffic density and short range telecommunications. The DECT system provides local mobility to portable users in an in-building Private Branch Exchange ("PBX"), and also supports telepoint services. The DECT system is configured around an open standard Open System Interconnection ("OSI"), which makes it possible to interconnect wide area fixed or mobile networks, such as ISDN or GSM, to a portable subscriber population. The DECT system provides relatively low power radio access between portable parts and fixed base stations at ranges of up to a few hundred meters, which is believed to be suitable for various industrial environments. In the DECT system, a control plane ("C-plane") and a user plane ("U-plane") use the services provided by the lower layers (that is, the physical layer and the medium access control ("MAC") layer).

The DECT system uses a FDMA/TDMA/TDD radio transmission method. Within a TDMA time slot, one out of ten carrier frequencies is dynamically selected and used. The physical layer specification requires that the channels have a bandwidth that is 1.5 times the channel data rate of 1152 kbps, which provides a channel bandwidth of 1.728MHz. Also, DECT has twenty-four time slots per frame, and these twenty-four time slots make up a DECT frame having a 10 millisecond duration. In each time slot, 480 bits are allocated for 32 synchronization bits, 388 data bits, and 60 bits of guard time. The MAC layer includes a paging channel and a control channel for providing signaling information to the C-plane. The U-plane is served with channels for the transfer of user information. While the standard bit rate of the user information channel is 32 kbps, the DECT system also supports other bit rates, including, for example, 64 kbps (and other multiples of 32 kbps).

The DECT system operates in the 1880 MHz to 1900 MHz band, and within this band, the DECT standard defines ten channels from 1881.792 MHz to 1897.344 MHz having a spacing of 1728 kHz. Also, DECT supports a Multiple Carrier/TDMA/ TDD structure, and each DECT time slot may be assigned to a different channel. The DECT user data is provided in each time slot, and 320 user bits are provided during each time slot, which provide a 32-kbps data stream per user. Also, four (4) parity bits are used for crude error detection. The DECT control information is carried by 64 bits in every time slot of an established communication. These bits are assigned to one of the four logical channels depending on the control information so that the gross control channel data rate is 6.4 kbps per user. The DECT system uses error detection and retransmission to deliver control information, and each 64 bit control word contains 16 CRC bits. The maximum information throughput of the DECT control channel is 4.8 kbps. Also, in the DECT system, spatial diversity at the base station or receiver may be implemented by using two antennas, and the antenna which provides the best signal for each time slot is then used.

Because of at least some of these DECT features and their associated cost, it is believed that the DECT system, where approved, can be a practical wireless method for use with the present system in an industrial environment.

Figure 5:
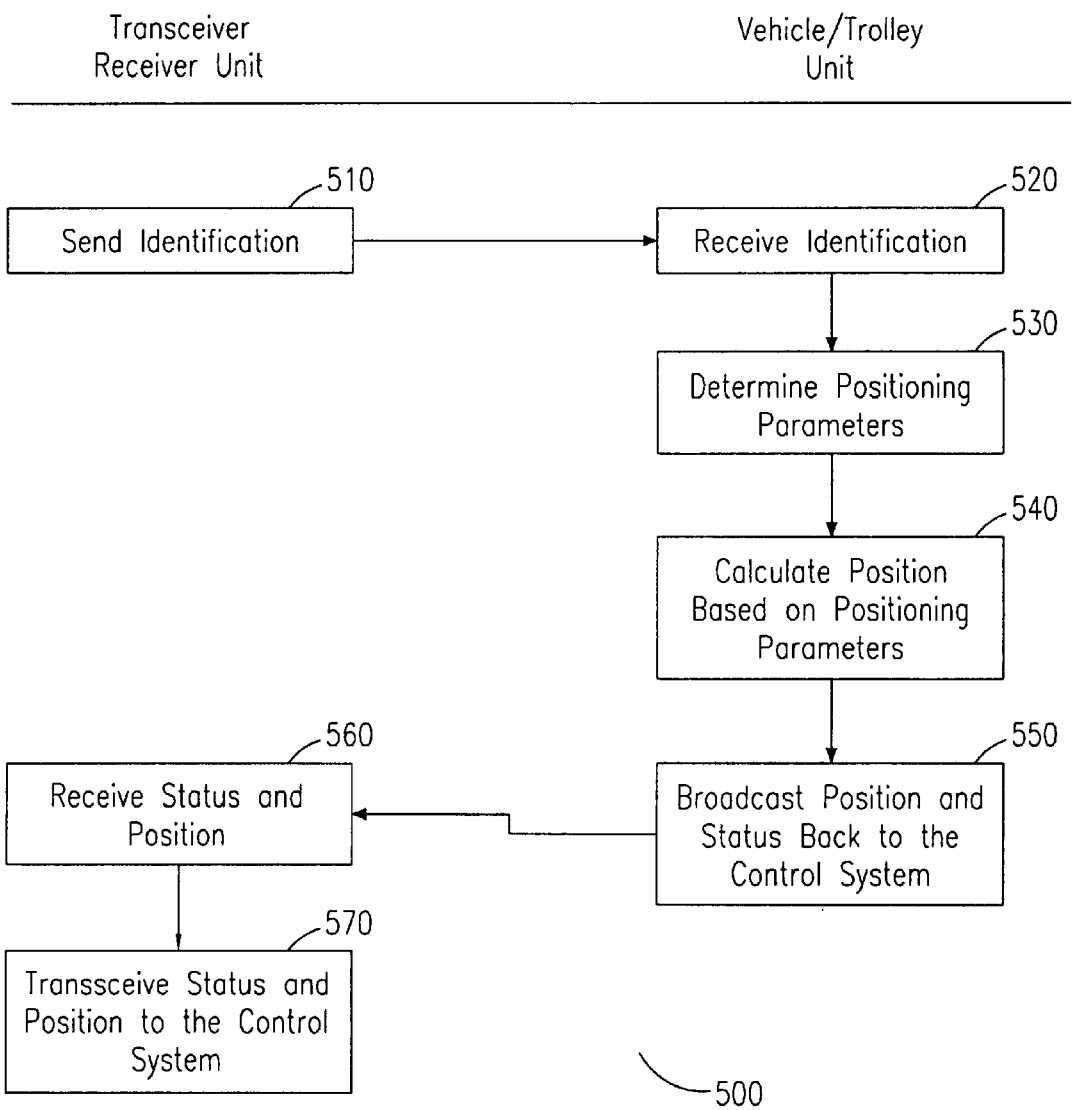
FIG. 5 shows a communication and local positioning method flowchart for use in connection with the communication and local positioning system of FIG. 1 and FIG. 3A.

More particularly with respect to FIGS. 1 and 3A, they each show the communication and local positioning system 100, which may use the local positioning method 500 of FIG. 5. In particular, the communication and local positioning system 100 includes the transceivers 110a, 110b, 110c, . . ., 110n. The transceivers 110a, 110b, 110c, . . ., 110n may, for example, represent localized sets of triple or quadruple transmitters transceivers or other suitably appropriate arrangements for use in different areas of an industrial factory. In each area, however, the first transmitter or transceiver 110a communicates or transmits a first transmitter or transceiver identification associated with a first physical location of the first transmitter or transceiver 110a, the second transmitter or transceiver 110b communicates or transmits a second transmitter or transceiver identification associated with a second physical location of the second transmitter or transceiver 110b, and the third transmitter or transceiver 110c communicates or transmits a third transmitter or transceiver identification associated with a third physical location of the third transmitter or transceiver 110c to the trolley or other vehicle F1, F2, F3, . . ., Fn (120a, 120b, 120c, . . ., 120n). A trolley or other vehicle communication transmitter or transceiver of the vehicle communication system K1, K2, K3, . . ., Kn (125a, 125b, 125c, . . ., 125n), which is associated with a corresponding trolley or other vehicle F1, F2, F3, . . ., Fn (120a, 120b, 120c, 120n) receives the first transmitter or transceiver identification, the second transmitter or transceiver identification and the third transmitter or transceiver identification at the corresponding trolley or other vehicle F1, F2, F3, . . ., Fn (120a, 120b, 120c, . . ., 120n).

The vehicle local positioning processor P1, P2, P3, . . ., Pn (126a, 126b, 126c, . . ., 126n), which is associated with the corresponding trolley or other vehicle F1, F2, F3, . . ., Fn (120a, 120b, 120c, . . ., 120n) processes the first transmitter or transceiver identification, the second transmitter or transceiver identification, and the third transmitter or transceiver identification, to determine a first positioning parameter of the trolley or other vehicle 120a, 120b, 120c, . . ., 120n based on the first transmitter or transceiver identification, a second positioning parameter of the trolley or other vehicle F1, F2, F3, . . ., Fn (120a, 120b, 120c, . . ., 120n) based on the second transmitter or transceiver identification, and a third positioning parameter of the trolley or other vehicle F1, F2, F3, . . ., Fn (120a, 120b, 120c, . . ., 120n) based on the third transmitter or transceiver identification. The vehicle local positioning processor P1, P2, P3, . . ., Pn (126a, 126b, 126c, . . ., 126n) of the trolley or other vehicle F1, F2, F3, . . ., Fn (120a, 120b, 120c, . . ., 120n) may also be used to determine a position of the trolley or other vehicle based on the first positioning parameter, the second positioning parameter and the third positioning parameter.

Each of the positioning parameters may correspond to a distance between a transmitter or transceiver S1, S2, S3, . . ., Sn (110a, 110b, 110c, . . ., 110n) and the trolley or other vehicle 120a, 120b, 120c, . . ., 120n. Such a distance may be determined based on a communication time between a location of the transmitter or transceiver 110a, 110b, 110c, . . ., 110n and the trolley or other vehicle. In this regard, the communication times and/or distances may be determined using a suitably appropriate variation of the algorithms and methodologies of the Global Positioning System. Since, however, the systems are being used in industrial or manufacturing environments. The steel content of the industrial or manufacturing site may interfere with the transmission of the transmitter or transceiver signals that are transmitted to the trolleys or other vehicles 120a, 120b, 120c, . . ., 120n and may therefore interfere with the accurate determination of the distance and/or communication times that may be used to determine the position of the trolleys or other vehicles 120a, 120b, 120c, . . ., 120n. Accordingly, it is believed that either the manufacturing site may need to be arranged to better ensure that there are no interfering metallic structures in the line of sight of the transceivers S1, S2, S3 . . ., Sn (110a, 110b, 110c, . . ., 110n) and the trolleys or other vehicles 120a, 120b, 120c, . . ., 120n. Alternatively, the algorithms used to determine the communication times, distances and/or related angles may need to be suitably adjusted so as to reflect the effect of any interfering metallic structures.

A vehicle communication system K1, K2, K3, . . ., Kn (125a, 125b, 125c, . . ., 125n) associated with the corresponding trolley or other vehicle F1, F2, F3, . . ., Fn (120a, 120b, 120c, . . ., 120n) communicates at least the position from the trolley or other vehicle F1, F2, F3, . . ., Fn (120a, 120b, 120c, . . ., 120n) to the communication and controller arrangement 130 having the controller arrangement 116, which is adapted or otherwise configured to control the trolley or other vehicle system 115 and its trolleys or other vehicles F1, F2, F3, Fn (120a, 120b, 120c, . . ., 120n). The communication and controller arrangement 130 includes the communication system 118 that may include the wireless communication sub-systems 117a, 117b and 117c and/or the communication bus system 117, which may be, for example, a Process Field Bus (PROFIBUS) arrangement for interconnecting the wireless communication sub-systems 117a, 117b and 117c and the controller arrangement 116.

Figure 4:
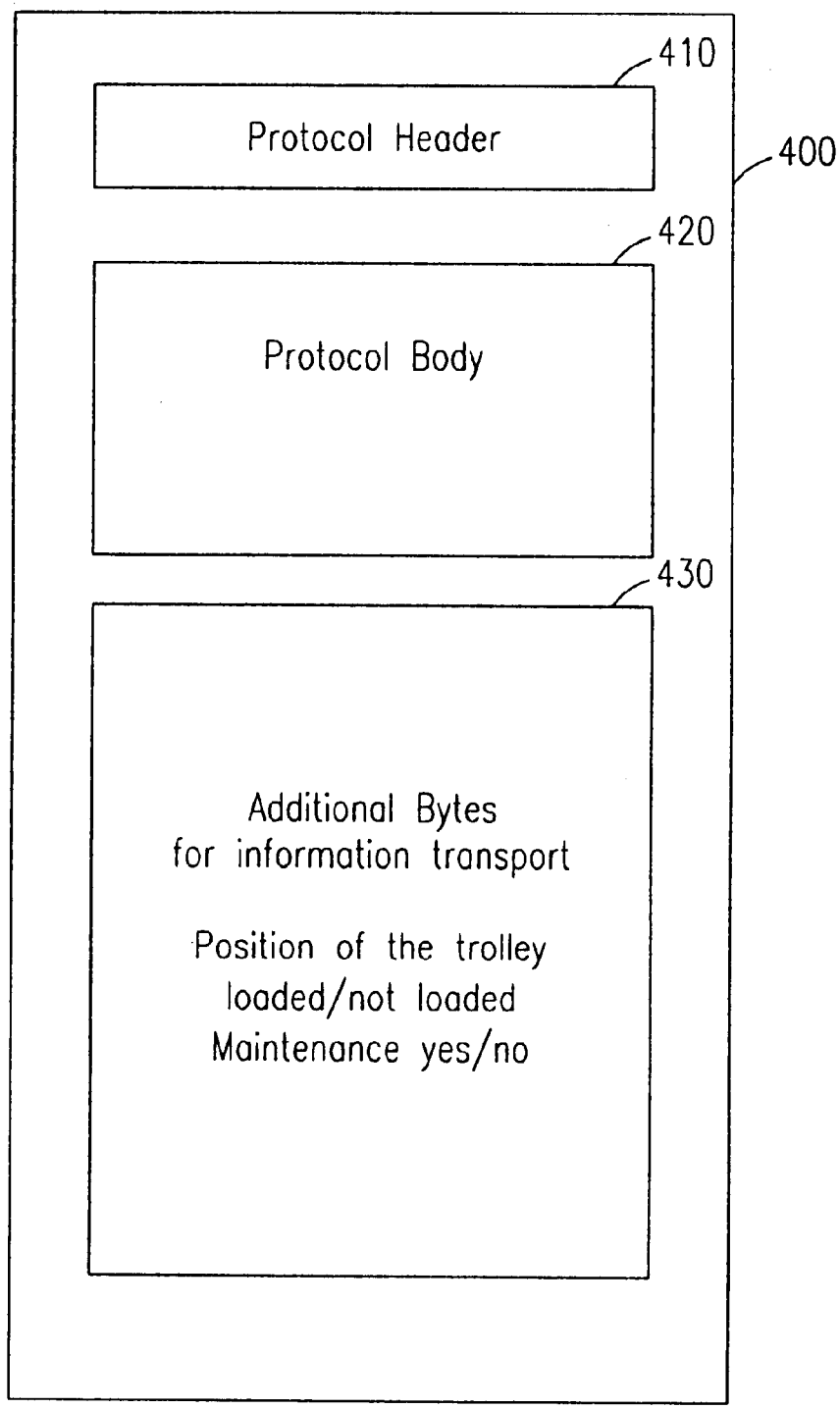
FIG. 4 shows a local positioning protocol for use with the communication and local positioning system of FIG. 1 and FIG. 3A.

In particular, the vehicle communication system K1, K2, K3, . . ., Kn (125a, 125b, 125c, . . ., 125n) of the trolley or other vehicle F1, F2, F3, . . ., Fn (120a, 120b, 120c, . . ., 120n) may communicate the trolley or other vehicle message 400 having the local position system protocol of FIG. 4. As shown in FIG. 4, the local position system protocol may include, for example, a protocol header frame 410, a protocol position frame 420 (which may contain the position signal information), an additional information frame 430 (which may contain additional trolley or other vehicle information, such as, for example, trolley or other vehicle load type and status, maintenance status, etc.), and a protocol end frame 440. The protocol header frame 410 and the protocol end frame 440 may include the appropriate communication protocol information, such as, for example, communication "handshaking" information.

Each of the processors, including the controller arrangement 116 and the trolley or other vehicle local positioning processors P1, P2, P3, . . ., Pn (126a, 126b, 126c, . . ., 126n) may include hardwired logic, a microcontroller, a microprocessor or an ASIC implementation, or any other suitably appropriate information processing structure, including a memory, for processing the critical operating or safety information. The particular choice may depend, of course, on the particular application and any suitably appropriate cost and design considerations. In particular, for example, the controller arrangement or control system 116 may be a programmable logic controller, such as an S7-400, which is available from Siemens AG of Munich, Germany.

FIG. 5 shows a communication and local positioning method flowchart for use with the communication and local positioning system 100 of FIG. 1 and FIG. 3A. The local positioning method 500 of FIG. 5 is an exemplary embodiment of the present invention for use with a trolley or other vehicle system in an industrial environment. In particular, the method 500 includes the following steps. In step 510, the following occurs: the first transmitter or transceiver 110a communicates or transmits a first transmitter or transceiver identification associated with a first physical location of the first transmitter or transceiver 110a; the second transmitter or transceiver 110b communicates or transmits a second transmitter or transceiver identification associated with a second physical location of the second transmitter or transceiver 110b; and the third transmitter or transceiver 110c communicates or transmits a third transmitter or transceiver identification associated with a third physical location of the third transmitter or transceiver 110c to the trolley or other vehicle F1, F2, F3, . . ., Fn (120a, 120b, 120c, . . ., 120n). Next, in step 520, a vehicle communication transmitter or transceiver of the vehicle communication system K1, K2, K3, . . ., Kn (125a, 125b, 125c, . . ., 125n) receives the first transmitter or transceiver identification, the second transmitter or transceiver identification and the third transmitter or transceiver identification at the trolley or other vehicle F1, F2, F3, . . ., Fn (120a, 120b, 120c, . . ., 120n).

In step 530, the vehicle local positioning processor P1, P2, P3, . . ., Pn (126a, 126b, 126c, . . ., 126n) of the trolley or other vehicle F1, F2, F3, . . ., Fn (120a, 120b, 120c, . . ., 120n) then processes the first transmitter or transceiver identification, the second transmitter or transceiver identification and the third transmitter or transceiver identification to determine a first positioning parameter of the trolley or other vehicle F1, F2, F3, . . ., Fn (120a, 120b, 120c, . . ., 120n) based on the first transmitter or transceiver identification, a second positioning parameter of the trolley or other vehicle F1, F2, F3, . . ., Fn (120a, 120b, 120c, 120n) based on the second transmitter or transceiver identification and a third positioning parameter of the trolley or other vehicle F1, F2, F3, . . ., Fn (120a, 120b, 120c, . . ., 120n) based on the third transmitter or transceiver identification. Next, in step 540, the vehicle local positioning processor P1, P2, P3, . . ., Pn (126a, 126b, 126c, . . ., 126n) of the trolley or other vehicle F1, F2, F3, . . ., Fn (120a, 120b, 120c, . . ., 120n) determines a position of the trolley or other vehicle based on the first positioning parameter, the second positioning parameter and the third positioning parameter.

In step 550, the vehicle communication system K1, K2, K3 . . ., Kn (125a, 125b, 125c, . . ., 125n) of the trolley or other vehicle F1, F2, F3, . . ., Fn (120a, 120b, 120c, . . ., 120n) communicates at least the position from the trolley or other vehicle F1, F2, F3, . . ., Fn (120a, 120b, 120c, . . ., 120n) to the communication and controller arrangement 130, and, in particular, to the controller arrangement 116, which is adapted or otherwise configured to control the trolley or other vehicle system 115 and its trolleys or other vehicles F1, F2, F3, . . ., Fn (120a, 120b, 120c, . . ., 120n). Accordingly, in step 560, the vehicle position and/or status information is received. As discussed, the communication and controller arrangement 130 includes a communication system 118 that may include the wireless communication sub-systems 117a, 117b and 117c and/or the communication bus system 117, which may be, for example, a Process Field Bus (PROFIBUS) arrangement for interconnecting the wireless communication sub-systems 117a, 117b and 117c and the controller arrangement 116. Thus, in step 570, the vehicle position and/or status information are provided to the controller arrangement or control system 116.

In particular, the vehicle communication system K1, K2, K3, ..., Kn (125a, 125b, 125c, ..., 125n) of the trolley or other vehicle F1, F2, F3, ..., Fn (120a, 120b, 120c, ..., 120n) may communicate the trolley or other vehicle message 400 having the local position system protocol of FIG. 4, which may include the protocol header frame 410, the protocol position frame 420 (which contains the position signal information), the additional information frame 430 (which may contain additional trolley or other vehicle information, such as, for example, trolley or other vehicle load type and status, maintenance status, etc.), and the protocol end frame 440. As discussed, the protocol header frame 410 and the protocol end frame 440 may include the appropriate communication protocol information, such as, for example, communication "handshaking" information.

What is claimed is:

1. A local positioning method for use with a vehicle system in an industrial environment, the method comprising the steps of:

communicating a first transmitter identification associated with a first transmitter location, a second transmitter identification associated with a second transmitter location, and at least a third transmitter identification associated with at least a third transmitter location to a vehicle;

receiving the first transmitter identification, the second transmitter identification and the at least the third transmitter identification at the vehicle;

determining a first positioning parameter of the vehicle based on the first transmitter identification, a second positioning parameter of the vehicle based on the second transmitter identification, and at least a third positioning parameter of the vehicle based on the at least the third transmitter identification;

determining a position of the vehicle based on the first positioning parameter, the second positioning parameter and the at least the third positioning parameter; and communicating at least the position from the vehicle to a controller arrangement that is adapted to control the vehicle system, and wherein the controller arrangement is adapted with a DECT wireless communication system for handling at least data and positioning information.

2. The method of claim 1, wherein the first positioning parameter is a first distance between the first transmitter location and the vehicle, the second positioning parameter is a second distance between the second transmitter location and the vehicle, and the at least the third positioning parameter is at least a third distance between the at least the third transmitter location and the vehicle.

3. The method of claim 1, wherein the first positioning parameter is a first communication time between the first transmitter location and the vehicle, the second positioning parameter is a second communication time between the second transmitter location and the vehicle, and the at least the third positioning parameter is at least a third communication time between the at least the third transmitter location and the vehicle.

4. The method of claim 1, wherein the at least the position includes position information and at least one of a vehicle maintenance status and a vehicle load status.

5. A local positioning system for use with a vehicle system in an industrial environment, the system comprising:

a controller arrangement that is adapted to control the vehicle system;

a transmitter arrangement that is adapted to communicate a first transmitter identification associated with a first transmitter location, a second transmitter identification associated with a second transmitter location, and at least a third transmitter identification associated with at least a third transmitter location to a vehicle;

a receiving arrangement associated with the vehicle and that is adapted to receive the first transmitter identification, the second transmitter identification and the at least the third transmitter identification;

a processing arrangement associated with the vehicle and that is adapted to determine: a first positioning parameter of the vehicle based on the first transmitter identification; a second positioning parameter of the vehicle based on the second transmitter identification; at least a third positioning parameter of the vehicle based on the at least the third transmitter identification; and a position of the vehicle based on the first positioning parameter, the second positioning parameter and the at least the third positioning parameter; and a communicating arrangement associated with the vehicle and that is adapted to communicate at least the position of the vehicle to the controller arrangement, wherein the controller arrangement is adapted with a DECT wireless communication system for handling at least data and positioning information.

6. The system of claim 5, wherein the first positioning parameter is a first distance between the first transmitter location and the vehicle, the second positioning parameter is a second distance between the second transmitter location and the vehicle, and the at least the third positioning parameter is at least a third distance between the at least the third transmitter location and the vehicle.

7. The system of claim 5, wherein the first positioning parameter is a first communication time between the first transmitter location and the vehicle, the second positioning parameter is a second communication time between the second transmitter location and the vehicle, and the at least the third positioning parameter is at least a third communication time between the at least the third transmitter location and the vehicle.

8. The system of claim 5, wherein the at least the position includes position information and at least one of a vehicle maintenance status and a vehicle load status.

9. A local positioning system for use with a vehicle system in an industrial environment, the system comprising:

means for controlling a vehicle system;

means for communicating a first transmitter identification associated with a first transmitter location, a second transmitter identification associated with a second transmitter location, and at least a third transmitter identification associated with at least a third transmitter location to a vehicle;

means for receiving the first transmitter identification, the second transmitter identification and the at least the third transmitter identification, wherein the means for receiving is associated with the vehicle;

means for determining a first positioning parameter of the vehicle based on the first transmitter identification, a second positioning parameter of the vehicle based on the second transmitter identification, and at least a third positioning parameter of the vehicle based on the at least the third transmitter identification;

means for determining a position of the vehicle based on the first positioning parameter, the second positioning parameter and the at least the third positioning parameter; and means for communicating at least the position of the vehicle to the means for controlling, wherein the means for controlling is adapted with a DECT wireless communication system for handling at least data and positioning information.

10. The system of claim 9, wherein the first positioning parameter is a first distance between the first transmitter location and the vehicle, the second positioning parameter is a second distance between the second transmitter location and the vehicle, and the at least the third positioning parameter is at least a third distance between the at least the third transmitter location and the vehicle.

11. The system of claim 9, wherein the first positioning parameter is a first communication time between the first transmitter location and the vehicle, the second positioning parameter is a second communication time between the second transmitter location and the vehicle, and the at least the third positioning parameter is at least a third communication time between the at least the third transmitter location and the vehicle.

12. The system of claim 9, wherein the at least the position includes position information and at least one of a vehicle maintenance status and a vehicle load status.

13. A local positioning method for use with a vehicle system in an industrial environment, the method comprising the steps of:

communicating a first transmitter identification associated with a first transmitter location, a second transmitter identification associated with a second transmitter location, a third transmitter identification associated with a third transmitter location, and a fourth transmitter identification associated with a fourth transmitter location to a vehicle;

receiving the first transmitter identification, the second transmitter identification, the third transmitter identification, and the fourth transmitter identification at the vehicle;

determining a first positioning parameter of the vehicle based on the first transmitter identification, a second positioning parameter of the vehicle based on the second transmitter identification, a third positioning parameter of the vehicle based on the third transmitter identification, and a fourth positioning parameter of the vehicle based on the fourth transmitter identification;

determining a position of the vehicle based on the first positioning parameter, the second positioning parameter, the third positioning parameter, and the fourth positioning parameter; and communicating at least the position from the vehicle to a controller arrangement that is adapted to control the vehicle system, and wherein the controller arrangement is adapted with a DECT wireless communication system for handling at least data and positioning information.

14. The method of claim 13, wherein the first positioning parameter is a first distance between the first transmitter location and the vehicle, the second positioning parameter is a second distance between the second transmitter location and the vehicle, the third positioning parameter is a third distance between the third transmitter location and the vehicle, and the fourth positioning parameter is a fourth distance between the fourth transmitter location and the vehicle.

15. The method of claim 13, wherein the first positioning parameter is a first communication time between the first transmitter location and the vehicle, the second positioning parameter is a second communication time between the second transmitter location and the vehicle, the third positioning parameter is a third communication time between the third transmitter location and the vehicle, and the fourth positioning parameter is a fourth communication time between the fourth transmitter location and the vehicle.

16. The method of claim 13, wherein the at least the position includes position information and at least one of a vehicle maintenance status and a vehicle load status.

17. A vehicle communication and processor system for use in a local positioning system having a plurality of transceivers and a vehicle system, including a controller arrangement that is adapted to control the vehicle system, in an industrial environment, the system comprising:

a receiving arrangement being associated with the vehicle and being adapted to receive a first transmitter identification associated with a first transmitter location, a second transmitter identification associated with a second transmitter location, and at least a third transmitter identification associated with at least a third transmitter location;

a processing arrangement that is adapted to determine: a first positioning parameter of the vehicle based on the first transmitter identification; a second positioning parameter of the vehicle based on the second transmitter identification; at least a third positioning parameter of the vehicle based on the at least third transmitter identification; and a position of the vehicle based on the first positioning parameter, the second positioning parameter and the at least the third positioning parameter; and a communicating arrangement being associated with the vehicle and being adapted to communicate at least the position of the vehicle to the controller arrangement, and wherein the controller arrangement is adapted with a DECT wireless communication system for handling at least data and positioning information.

18. The system of claim 17, wherein the first positioning parameter is a first distance between the first transmitter location and the vehicle, the second positioning parameter is a second distance between the second transmitter location and the vehicle, and the at least the third positioning parameter is at least a third distance between the at least the third transmitter location and the vehicle.

19. The system of claim 17, wherein the first positioning parameter is a first communication time between the first transmitter location and the vehicle, the second positioning parameter is a second communication time between the second transmitter location and the vehicle, and the at least the third positioning parameter is at least a third communication time between the at least the third transmitter location and the vehicle.

20. The system of claim 17, wherein the at least the position includes position information and at least one of a vehicle maintenance status and a vehicle load status.

21. A local positioning method for use with a vehicle system, comprising the steps of:

receiving position data related to at least one vehicle;

processing the received position data with a DECT wireless communication system;

controlling the at least one vehicle, at least in part, by way of the DECT wireless communication system; and communicating additional data to the at least one vehicle by way of the DECT wireless communication system.

* * * * *